United States Patent
Parham (10) Patent No.: US 7,124,981 B2
(45) Date of Patent: Oct. 24, 2006

(54) THRUST REVERSER UTILIZING INTEGRATED STRUCTURAL BYPASS DUCT

(75) Inventor: Dean Parham, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 779 days.

(21) Appl. No.: 10/379,029

(22) Filed: Mar. 4, 2003

(65) Prior Publication Data

US 2004/0195434 A1    Oct. 7, 2004

(51) Int. Cl.
*F02K 3/04* (2006.01)

(52) U.S. Cl. .................................. 244/110 B; 60/226.2

(58) Field of Classification Search ............ 244/110 B; 60/226.2, 230; 239/265.19, 265.25, 265.29, 239/265.31, 265.37
See application file for complete search history.

(56) References Cited

U.S. PATENT DOCUMENTS

| | | | |
|---|---|---|---|
| 3,248,878 A * | 5/1966 | Clark et al. ................. 60/229 |
| 3,779,010 A * | 12/1973 | Chamay et al. ............. 60/226.2 |
| 3,981,463 A * | 9/1976 | Pazmany ................. 244/110 B |
| 4,026,105 A | 5/1977 | James |
| 4,030,290 A | 6/1977 | Stachowiak |
| 4,047,682 A | 9/1977 | Brownhill |
| 4,183,478 A | 1/1980 | Rudolph |
| 4,807,434 A * | 2/1989 | Jurich ..................... 60/226.2 |
| 4,914,905 A | 4/1990 | Dubois et al. |
| 5,120,004 A | 6/1992 | Matthias |
| 5,243,817 A | 9/1993 | Matthias |
| 5,310,117 A | 5/1994 | Fage et al. |
| 5,524,431 A | 6/1996 | Brusson et al. |
| 5,547,130 A | 8/1996 | Davies |
| 5,794,434 A * | 8/1998 | Szupkay .................... 60/226.2 |
| 5,987,880 A * | 11/1999 | Culbertson .................. 60/204 |
| 6,042,053 A | 3/2000 | Sternberger et al. |
| 6,148,607 A | 11/2000 | Baudu et al. |

FOREIGN PATENT DOCUMENTS

EP          580 352       12/1996

* cited by examiner

*Primary Examiner*—Tien Dinh
(74) *Attorney, Agent, or Firm*—Harness Dickey & Pierce P.L.C.

(57) ABSTRACT

A thrust reverser having an engine cowl, a nacelle, a blocker door, a nacelle door and a cascade vane. The engine cowl has a hollow body that shrouds a jet engine and which includes a cowl opening. The nacelle surrounds the engine cowl and includes a nacelle opening that is positioned outwardly of the cowl opening. The blocker door is associated with the engine cowl and movable between a first position, wherein the blocker door closes the cowl opening, and a second position, wherein the blocker door is disposed in the propulsive air flow and substantially clears the cowl opening. The nacelle door is associated with the nacelle and movable between a forward position, which substantially closes the nacelle opening, and a rearward position, which substantially clears the nacelle opening. The cascade vane is disposed between the engine cowl and the nacelle and positioned between the cowl and nacelle openings.

12 Claims, 5 Drawing Sheets

THRUST REVERSER UTILIZING INTEGRATED STRUCTURAL BYPASS DUCT

FIELD OF THE INVENTION

The present invention generally relates thrust reversers for jet engines and more particularly to a thrust reverser configuration that employs an integrated structural bypass duct to isolate the nacelle from the engine. A method for operating a thrust reverser is also provided.

BACKGROUND OF THE INVENTION

Jet aircraft, such as commercial passenger and military aircraft, utilize thrust reversers on the aircraft's jet engines to reduce the aircraft's speed after landing. One type of thrust reverser used in modern jet aircraft is the cascade type, which is described in more detail in U.S. Pat. No. 5,448,884, which is hereby incorporated by reference as if fully set forth herein.

Figure 1:
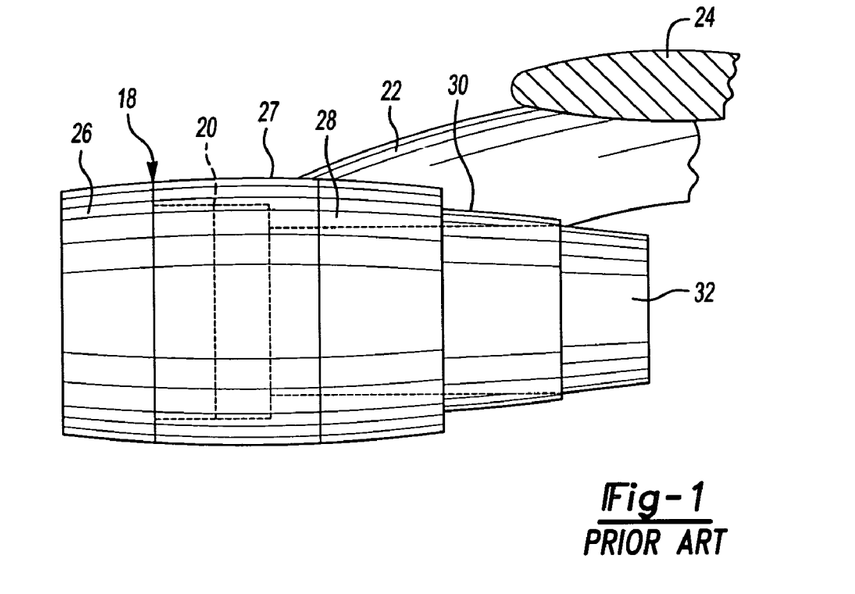
FIG. 1 is a side elevation view of a portion of an aircraft having a conventional thrust reverser system.

Referring to FIG. 1, a conventional aircraft nacelle is indicated by reference numeral 18. The nacelle 18 shrouds a jet engine 20, which is supported on a strut or pylon 22 that is coupled to a wing 24 (only a portion of which is shown). The nacelle 18 includes a nose cowl 26, a fan cowl 27, a thrust reverser sleeve 28, a core cowl 30 and a nozzle exhaust 32. Although several of these components are made up of two mirror-image sub-components that are split vertically in a clamshell arrangement, each component will be referred to herein as being one piece.

Figure 2:
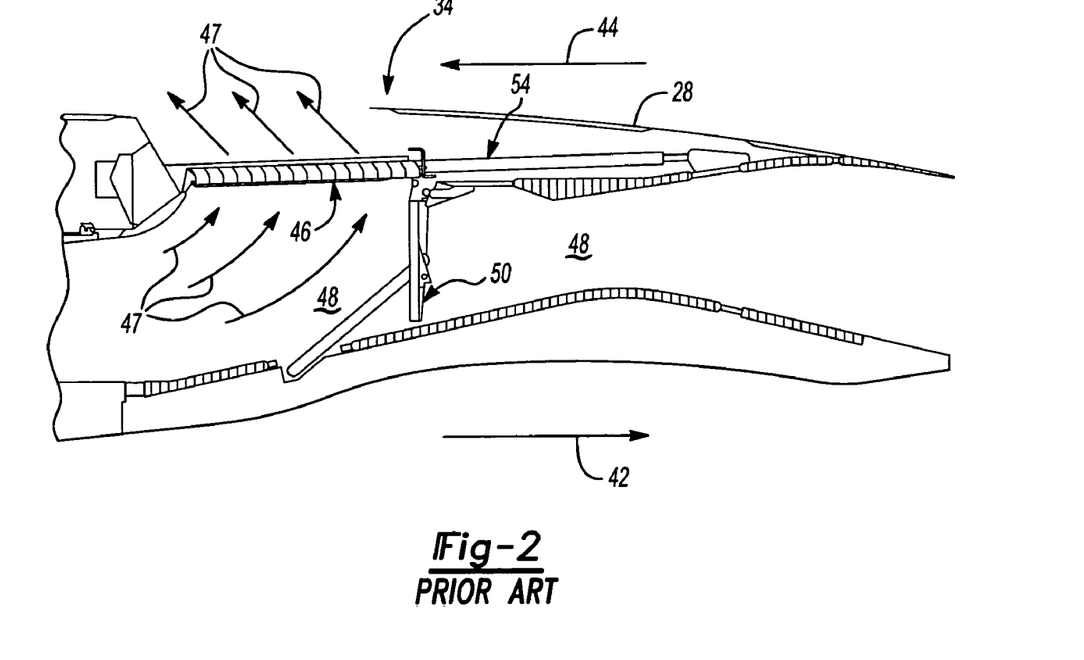
FIG. 2 is a longitudinal section view of a portion of the aircraft of FIG. 1 illustrating the conventional thrust reverser in greater detail.
Figure 3:
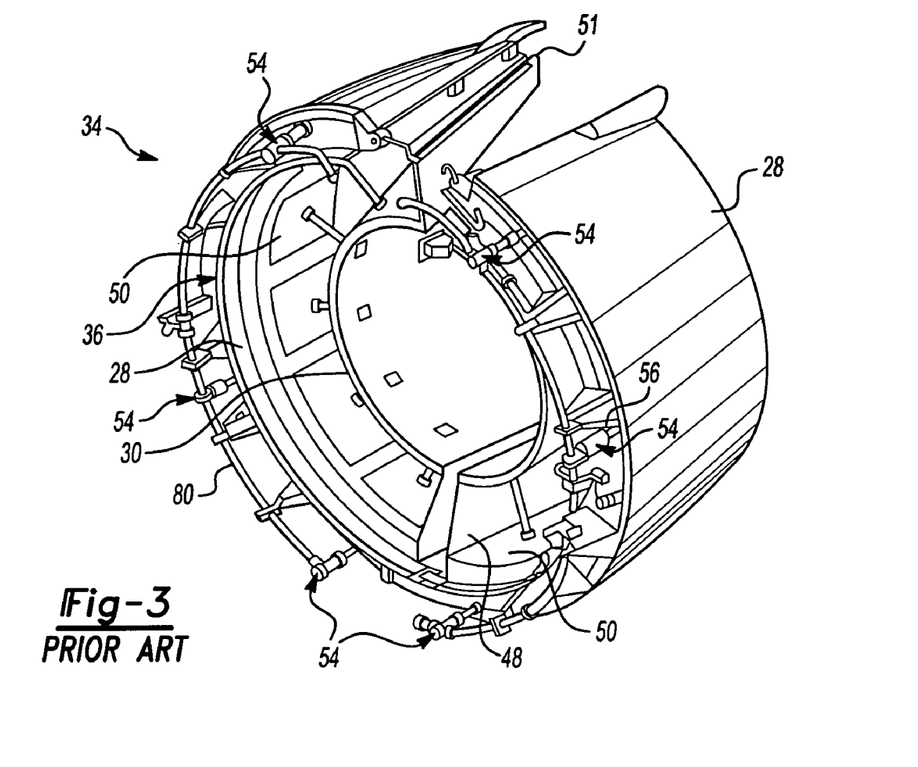
FIG. 3 is a perspective view of a portion of the aircraft of FIG. 1 illustrating the thrust reverser in greater detail.

As shown in more detail in FIGS. 2 and 3, the thrust reverser system 34 includes an inner duct or fan duct cowl 36 and an outer sleeve 38. The outer sleeve 38 translates in an aft direction as identified by arrow 42 and a forward direction indicated by arrow 44. When the thrust reverser is deployed, the translating sleeve 38 moves aft from a stowed position shown in FIG. 1 to a deployed position shown in FIG. 2. In this process, cascade vanes 46 mounted to the thrust reverser support structure are uncovered. The cascade vanes 46 are slanted in a forward direction so that during the operation of the thrust reverser system 34, fan air (designated by arrow 47) from the engine fan is re-directed forward through the cascade vanes 46 to aid in decelerating the aircraft.

Air driven aft by the engine fan flows along an annular duct 48 that is formed between the fun duct cowl 36 and the core duct cowl 30. Movement of the sleeve 38 in the aft direction causes blocker doors 50 to pivot from their stowed positions (FIG. 3) to their deployed positions (FIG. 2) where the blocker doors 50 are positioned to block rearward movement of the air from the engine fan through the duct 48. In this manner, all rearward movement of the air from the engine fan is re-directed forward through the cascade vanes 46.

One drawback of the above-referenced thrust reverser system 34 is that such systems are integrated into both the nacelle and the bypass structure. Accordingly, any engine movement will effect the external nacelle flow lines.

SUMMARY OF THE INVENTION

In one preferred form, the present invention provides a thrust reverser system having an engine cowl, a nacelle, a blocker door, a nacelle door and a cascade vane. The engine cowl has a hollow body that shrouds a jet engine and which includes a cowl opening. The nacelle surrounds the engine cowl and includes a nacelle opening that is positioned outwardly of the cowl opening. The blocker door is associated with the engine cowl and movable between a first position, wherein the blocker door closes the cowl opening, and a second position, wherein the blocker door is disposed in the propulsive air flow and substantially clears the cowl opening. The nacelle door is associated with the nacelle and movable between a forward position, which substantially closes the nacelle opening, and a rearward position, which substantially clears the nacelle opening. The cascade vane is disposed between the engine cowl and the nacelle and positioned between the cowl and nacelle openings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 4:
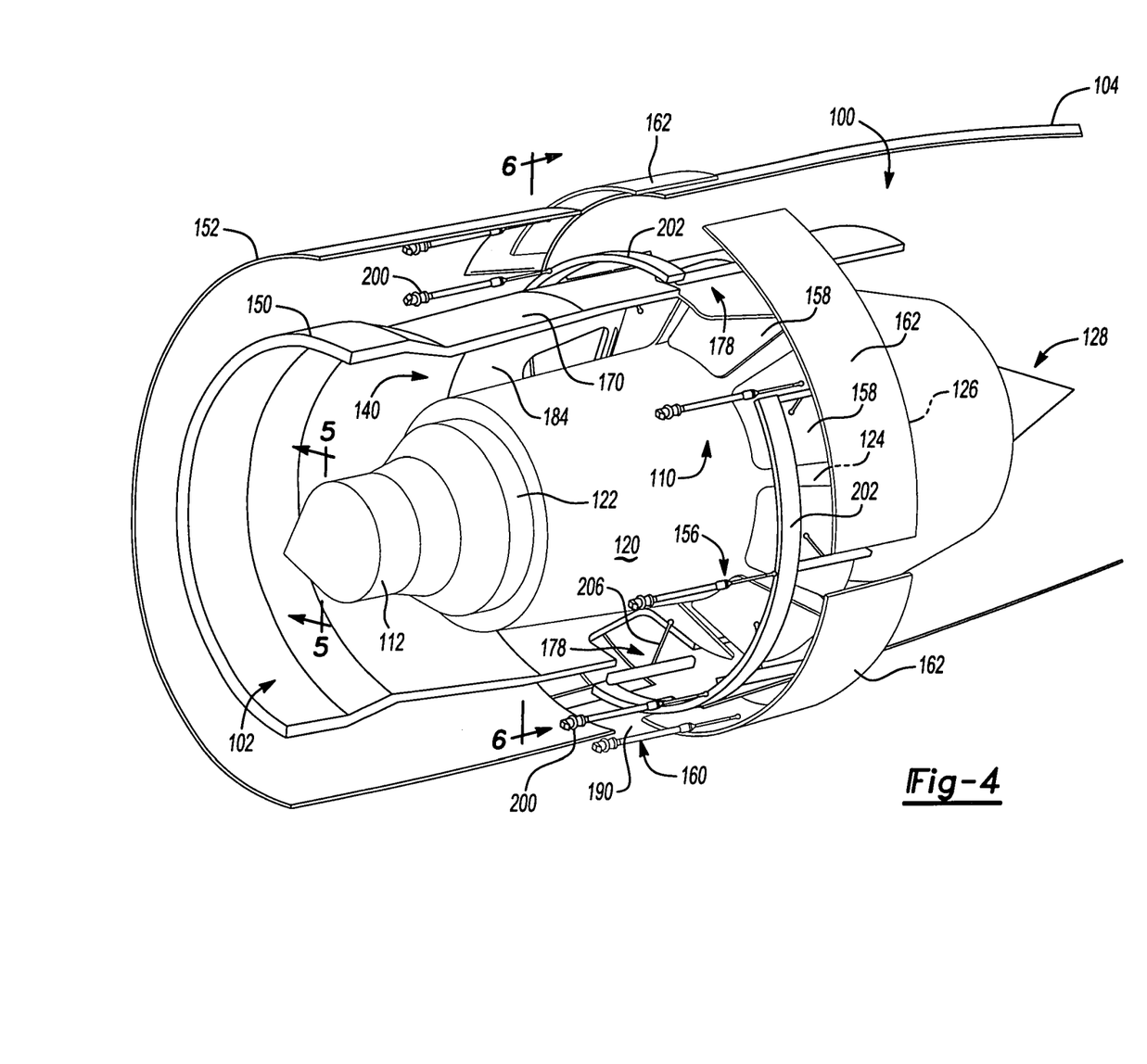
FIG. 4 is an exploded perspective view of a portion of an aircraft illustrating a thrust reverser system constructed in accordance with the teachings of the present invention.

With reference to FIG. 4 of the drawings, a thrust reverser system 100 constructed in accordance with the teachings of the present invention is illustrated in operative association with a turbofan jet engine 102 of an aircraft 104. The turbofan jet engine 102 is conventional in its construction and operation and as such, need not be described in significant detail. Briefly, the turbofan jet engine 102 includes a core engine 110 and a fan section 112. The core engine 110 is housed in an inner hollow duct 120 and includes a compressor section 122 having a plurality of rotating blades (not shown) that slow and increase the pressure of the incoming air. Thereafter the higher pressure air is forced into a combustion section 124 where it is mixed with fuel and burned. The high-pressure gases leaving the combustion section 124 are exhausted through a turbine section 126, causing the blades (not shown) within the turbine section 126 to rotate. Since a shaft connects the turbine blades to the compressor blades, the exhaust flow is employed to bring more air into the compressor section 122 to keep the core engine 110 operating. After passing through the turbine section 126, the exhaust gasses are directed through a nozzle 128 to create forward thrust.

The fan section 112 is located forwardly of the compressor section 122 and includes a plurality of fan blades (not shown) that are also driven by the turbine section 126 of the core engine 110. The primary purpose of the fan section 112 is to drive a large volume of air around the perimeter of the core engine 110 to create a propulsive air flow 140 which is generally co-axial with the exhaust flow from the core engine 110. Although the speed of the propulsive air flow 140 is considerably slower than the speed of the exhaust flow, the large mass of air that is accelerated by the fan section 112 produces significant thrust.

Figure 5:
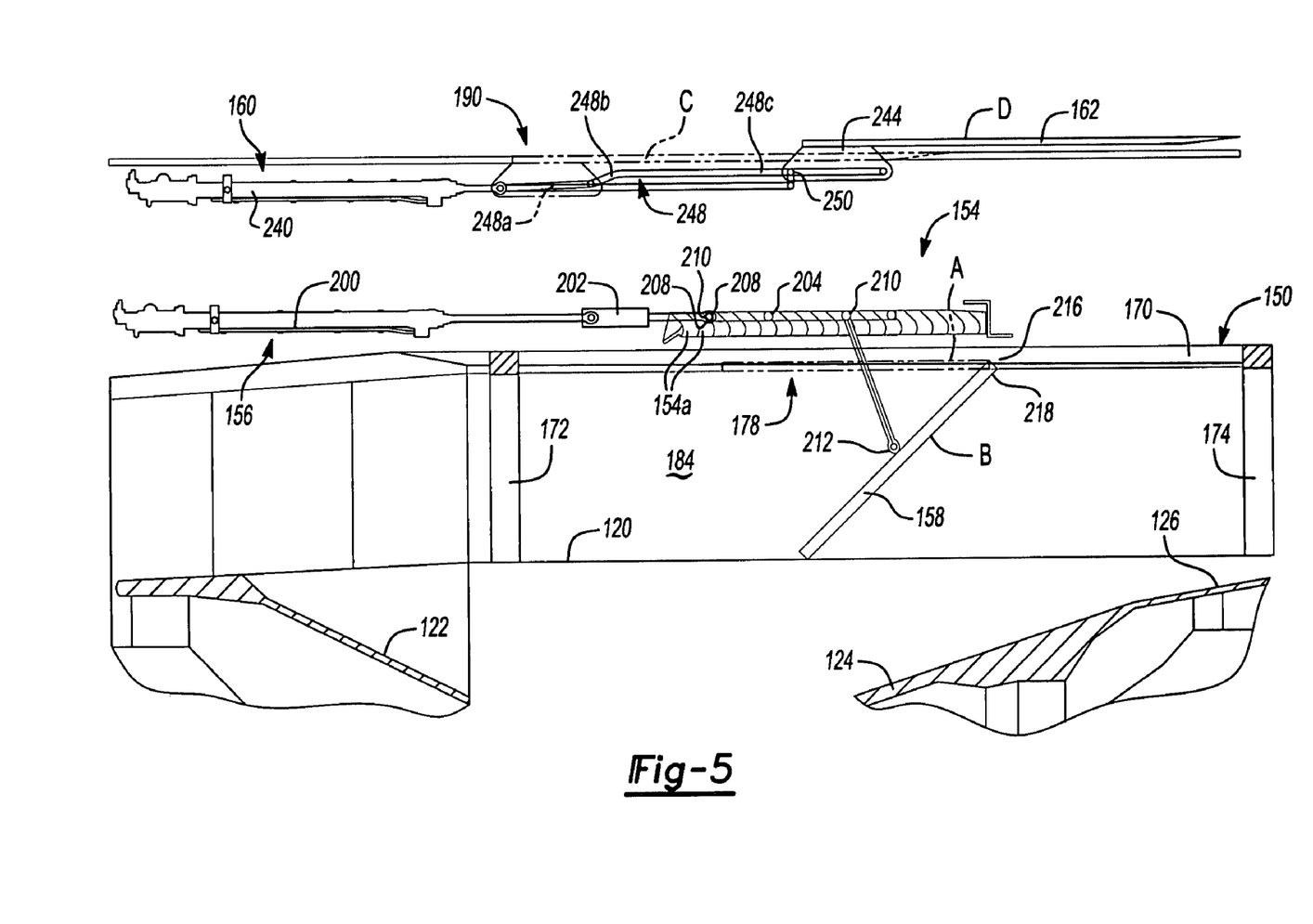
FIG. 5 is a longitudinal section view of a portion of the aircraft of FIG. 4 illustrating the thrust reverser system in greater detail.

With additional reference to FIG. 5, the exemplary thrust reverser system 100 illustrated includes an engine cowl 150, a nacelle 152, a plurality of cascade vanes 154 (FIG. 5), a first or blocker door actuator 156, a plurality of blocker doors 158, a second or nacelle door actuator 160 and a plurality of nacelle doors 162. The engine cowl 150 includes a cowl body 170, a front mount 172 (FIG. 5) and a rear mount 174 (FIG. 5). The cowl body 170 is a generally hollow cylindrical structure that surrounds the core engine 110 and which includes a plurality of circumferentially spaced apart cowl openings 178. The cowl body 170 houses the fan blades of the fan section 112 and cooperates with the hollow duct 120 of the core engine 110 to form a fan duct 184 therebetween through which the propulsive air flow travels. The front and rear mounts 172 and 174 are employed to both mount the core engine 110 therein as well as to mount the engine cowl 150 to the structure of the aircraft 104.

The nacelle 152 surrounds at least a portion of the engine cowl 150 and includes a plurality of circumferentially spaced apart nacelle openings 190, wherein each of the nacelle openings 190 is positioned radially outwardly of an associated cowl opening 178. As the engine cowl 150 is employed to form the radially outward surface of the fan duct 184, the nacelle 152 is constructed without considerations for the movement of the core engine 110. As such, the steps or gaps in the nacelle of a conventional thrust reverser system that normally result from core engine movement are avoided so that the outer flow surface of the nacelle 152 remains constant during the flight of the aircraft 104.

Each of the cascade vanes 154 is mounted between the engine cowl 150 and the nacelle 152 in a position that is aligned with both an associated cowl opening 178 and an associated nacelle opening 190. The cascade vanes 154 are conventional in their construction and operation and as such, will not be discussed in significant detail. Briefly, each cascade vane 154 includes a plurality of vanes 154a that are operable for re-directing air flowing therethrough.

Figure 6:
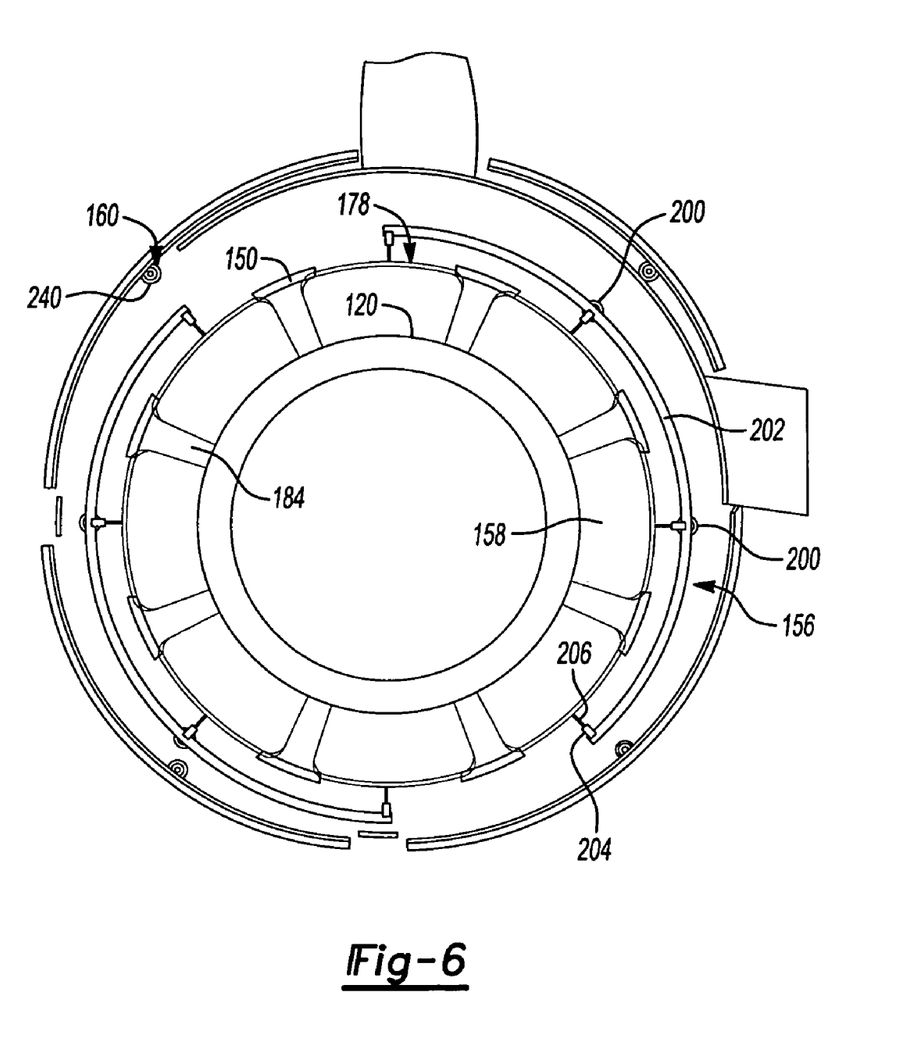
FIG. 6 is a sectional view taken along the line 6—6 of FIG. 4.

With reference to FIGS. 4 through 6, the blocker door actuator 156 is employed to move the blocker doors 158 between a first or retracted position (indicated by reference letter A in FIG. 5) and a second or deployed position (indicated by reference letter B in FIG. 5). In the particular embodiment illustrated, the blocker door actuator 156 includes a plurality of linear actuators 200, a pair of actuator slider bars 202, a plurality of slide tracks 204 and a plurality of drag links 206. The linear actuators 200 are conventionally constructed and may, for example, be ball screw mechanisms or hydraulic cylinders.

With specific reference to FIGS. 5 and 6, a pair of the linear actuators 200 are coupled via pins to each of the actuator slider bars 202 and provide a means by which the actuator slider bars 202 may be translated in a direction that is generally parallel to the longitudinal axis of the engine cowl 150. Each actuator slider bar 202 is coupled to a slide block 208 that is carried in an associated one of the slide tracks 204. The slide tracks 204 are conventionally operable for permitting longitudinal movement of the slide blocks 208 while inhibiting rotation and lateral movement of the slide blocks 208. A first pivot pin 210 pivotably couples a first end of an associated drag link 206 to the slide block 208 and a second pivot pin 212 pivotably couples a second end of the associated drag link 206 to a corresponding blocker door 158. A hinge 216 pivotably couples the rear end 218 of the blocker door 158 to the engine cowl 150 so that the blocker door 158 may be moved between the retracted position and the extended position.

Accordingly, movement of the linear actuators 200 in a rearward direction (i.e., toward the exhaust side of the core engine 110) causes the actuator slider bars 202 to move the slide blocks 208 rearwardly in their slide tracks 204 so that the drag links 206 pivot downwardly to thus pivot the blocker doors 158 into the extended position. With the blocker doors 158 thus positioned, at least a portion of the propulsive air flow is directed in radially outwardly through the cowl openings 178 and into the cascade vanes 154, which serve to redirect the air flowing therethrough in an outwardly and forwardly direction through the nacelle openings 190.

Similarly, movement of the linear actuators 200 in a forward direction (i.e., toward the fan section 112 of the core engine 110) causes the actuator slider bars 202 to move the slide blocks 208 forwardly in their slide tracks 204 so that the drag links 206 pivot upwardly to thus pivot the blocker doors 158 into the retracted position. With the blocker doors 158 thus positioned, the propulsive air flow is directed in a rearward direction out the distal or rear end of the engine cowl 150.

The nacelle door actuator 160 is employed to move the nacelle doors 162 between a closed position (indicated by reference letter C in FIG. 5) and an open position (indicated by reference letter D in FIG. 5). In the particular embodiment illustrated, the nacelle door actuator 160 includes a plurality of linear actuators 240, a plurality of slide blocks 244 and a plurality of slide tracks 248. Like the linear actuators 200, the linear actuators 240 are conventionally constructed and may, for example, be ball screw mechanisms or hydraulic cylinders.

Each linear actuator 240 is coupled to an associated nacelle door 162 via a pivot pin 250 and provides a means for translating an associated nacelle door 162 may be translated in a direction that is generally parallel to the longitudinal axis of the engine cowl 150. Each slide block 244 is mounted in an associated one of the slide tracks 248 and fixedly coupled to an associated nacelle door 162. The slide tracks 248 are conventionally operable for permitting longitudinal and controlled radially outward movement of the slide blocks 244 while inhibiting rotation and lateral movement of the slide blocks 208.

In contrast to the slide track 204, the slide track 248 is jogged so as to define three distinct portions: a retracted portion 248a, an intermediate portion 248b and an extended portion 248c. When the slide block 244 is positioned in the retracted portion 248a, the nacelle door 162 is located such that its exterior surface is flush to the exterior surface of the nacelle 152. When the slide block 244 is positioned in the extended portion 248c, the interior surface of the nacelle door 162 is located such that it is radially outwardly of the exterior surface of the nacelle 152. The intermediate portion 248b of the slide track 248 is operable for transitioning the slide block 244 between the retracted and extended portions 248a and 248c.

Accordingly, movement of the linear actuators 240 in a rearward direction (i.e., toward the exhaust side of the core engine 110) causes the slide blocks 244 to move rearwardly in their slide tracks 248 so that the nacelle doors 162 pivot radially outwardly and then travel rearwardly outside the nacelle 152 so that the nacelle doors 162 substantially clear the nacelle openings 190.

Similarly, movement of the linear actuators 240 in a forward direction (i.e., toward the fan section 112 of the core engine 110) causes the slide blocks 244 to move forwardly in their slide tracks 248 so that the nacelle doors 162 travel forwardly and then radially inward so that the nacelle doors 162 substantially close the nacelle openings 190.

During forward thrust operation of the core engine 110, the linear actuators 200 and 240 are maintained in their forward positions so that the blocker doors 158 and the nacelle doors 162 substantially close the cowl openings 178 and the nacelle openings 190, respectively. To actuate or deploy the thrust reverser system 100, the nacelle door actuator 160 is initially actuated to move the nacelle doors 162 from the closed position to the open position. Thereafter, the blocker door actuator 156 is actuated to extend the blocker doors 158 into the path of the propulsive air flow to thereby re-direct at least a portion of the propulsive air flow into the cascade vanes 154. As noted above, the cascade vanes 154 are turning vanes that direct the air flowing through the cowl openings 178 in a direction that is forwardly and outwardly such that it (the air) passes through the nacelle openings 190 and From the foregoing, those skilled in the art will appreciate that the core engine 110 is isolated from the nacelle 152 so that movement of the core engine 110 will not create gaps or other discontinuities that would effect the flow lines of the nacelle 152. Furthermore, construction of the thrust reverser system 100 in this manner isolates most of the components of the thrust reverser system 100 from the propulsive air flow when the thrust reverser system 100 is not deployed to thereby provide highly efficient forward thrust performance.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A thrust reverser system for an aircraft having a jet engine, the jet engine producing a propulsive air flow, the thrust reverser system comprising:
   an engine cowl having a generally hollow body, the body being configured to shroud at least a portion of the jet engine and including a cowl opening;
   a nacelle surrounding at least a portion of the engine cowl, the nacelle including a nacelle opening that is positioned radially outwardly of the cowl opening;
   a blocker door associated with the engine cowl and movable between a first position and a second position, wherein the blocker door is generally parallel the propulsive air flow and closes the cowl opening when the blocker door is placed in the first position, and wherein the blocker door is disposed in the propulsive air flow and substantially clears the cowl opening when the blocker door is placed in the second position;
   a nacelle cowl associated with the nacelle and movable between a forward position and a rearward position, wherein placement of the nacelle cowl in the forward position substantially closes the nacelle opening and wherein placement of the nacelle cowl in the rearward position substantially clears the nacelle opening; and
   a cascade vane disposed between the engine cowl and the nacelle and positioned between the cowl opening and the nacelle opening.

2. The thrust reverser system of claim 1, further comprising a first hydraulic actuator and a second hydraulic actuator, the first hydraulic actuator being employed to move the blocker door between the first and second positions and the second actuator being employed to move the nacelle cowl between the forward and rearward positions.

3. The thrust reverser system of claim 2, wherein the first hydraulic actuator includes a drag link that is pivotably coupled to the engine cowl at a first end and pivotably coupled to the blocker door at a second end.

4. The thrust reverser system of claim 3, wherein the first hydraulic actuator is a linear actuator.

5. The thrust reverser system of claim 2, wherein the second hydraulic actuator is a linear actuator.

6. The thrust reverser system of claim 1, further comprising a plurality of engine mounts, the engine mounts being configured to couple the jet engine to the engine cowl.

7. A jet aircraft comprising:
   an engine cowl having a cowl opening;
   a jet engine disposed in the engine cowl and producing a propulsive air flow that travels through at least a portion of the engine cowl;
   a nacelle disposed about at least a portion of the engine cowl, the nacelle having a nacelle opening that is positioned radially outwardly of the cowl opening;
   a cascade vane disposed between the engine cowl and the nacelle;
   a blocker door associated with the engine cowl, the blocker door being movable between a first position, which substantially closes the cowl opening, and a second position, which substantially clears the cowl opening, the blocker door operably re-directing at least a portion of the propulsive air flow out of the cowl opening and into the cascade vane when the blocker door is placed in the second position; and
   a nacelle door associated with the nacelle, the nacelle being movable between a closed position, which substantially closes the nacelle opening, and an open position, which substantially clears the nacelle opening;
   wherein no portion of the propulsive air flow flows between the engine cowl and the nacelle when the blocker door is in the first position and the nacelle door is in the closed position.

8. The jet aircraft of claim 7, further comprising a plurality of engine mounts coupling the jet engine to the engine cowl.

9. The jet aircraft of claim 7, further comprising a first actuator and a second actuator, the first actuator being employed to move the blocker door between the first and second positions and the second actuator being employed to move the nacelle cowl between the forward and rearward positions.

10. The thrust reverser system of claim 9, wherein the first actuator includes a drag link that is pivotably coupled to the engine cowl at a first end and pivotably coupled to the blocker door at a second end.

11. The thrust reverser system of claim 10, wherein the first actuator is a linear actuator.

12. The thrust reverser system of claim 9, wherein the second actuator is a linear actuator.

* * * * *

UNITED STATES PATENT AND TRADEMARK OFFICE
Certificate

Patent No. 7,124,981 B2                                                              Patented: October 24, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dean Parham, Issaquah, WA (US); and Peter Beardsley, Derby (GB)

Signed and Sealed this First Day of September 2009.

MICHAEL R. MANSEN
*Supervisory Patent Examiner*
Art Unit 3644